United States Patent
Zipplies et al.

(10) Patent No.: US 9,969,848 B2
(45) Date of Patent: May 15, 2018

(54) FLUOROPOLYMER COMPOSITIONS CONTAINING A POLYHYDROXY SURFACTANT

(71) Applicant: 3M INNOVATIVE PROPERTIES COMPANY, St. Paul, MN (US)

(72) Inventors: Tilman C. Zipplies, Burghausen (DE); Klaus Hintzer, Kastl (DE); Peter Bissinger, Diessen (DE); Michael C. Dadalas, Eggenfelden (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 248 days.

(21) Appl. No.: 14/891,592

(22) PCT Filed: May 16, 2014

(86) PCT No.: PCT/US2014/038309
§ 371 (c)(1),
(2) Date: Nov. 16, 2015

(87) PCT Pub. No.: WO2014/186648
PCT Pub. Date: Nov. 20, 2014

(65) Prior Publication Data
US 2016/0130409 A1    May 12, 2016

(30) Foreign Application Priority Data
May 17, 2013   (EP) .................................... 13168186

(51) Int. Cl.
*C08J 3/05* (2006.01)
*C09D 127/18* (2006.01)
*B05D 1/02* (2006.01)
*C08J 3/03* (2006.01)
*C09D 5/00* (2006.01)
*C09D 7/12* (2006.01)

(52) U.S. Cl.
CPC . *C08J 3/05* (2013.01); *C08J 3/03* (2013.01); *C09D 5/00* (2013.01); *C09D 7/1233* (2013.01); *C09D 127/18* (2013.01); *B05D 1/02* (2013.01); *C08J 2327/18* (2013.01)

(58) Field of Classification Search
CPC .............................. C09D 5/027; C09D 127/18
See application file for complete search history.

(56) References Cited

U.S. PATENT DOCUMENTS

| | | | |
|---|---|---|---|
| 3,037,953 A | 6/1962 | Marks | |
| 3,489,595 A | 1/1970 | Brown, Jr. | |
| 4,369,266 A | 1/1983 | Kuhls | |
| 4,391,940 A | 7/1983 | Kuhls | |
| 5,188,679 A | 2/1993 | Kretchmer | |
| 5,380,891 A | 1/1995 | Connor | |
| 5,576,381 A | 11/1996 | Bladel | |
| 6,288,160 B1 * | 9/2001 | Wada | C08K 5/5419 106/2 |
| 6,566,452 B1 | 5/2003 | Bladel | |
| 6,613,941 B1 | 9/2003 | Felix | |
| 6,833,403 B1 | 12/2004 | Bladel | |
| 2008/0178993 A1 | 7/2008 | Kelmartin | |
| 2016/0122572 A1 | 5/2016 | Zipplies | |

FOREIGN PATENT DOCUMENTS

| | | |
|---|---|---|
| CN | 1803892 A | 7/2006 |
| DE | 2714593 | 10/1978 |
| DE | 202004020048 | 4/2005 |
| EP | 0329154 | 8/1989 |
| EP | 0718364 | 6/1996 |
| EP | 0818506 | 1/1998 |
| EP | 0969055 | 1/2000 |
| EP | 1016466 | 7/2000 |
| EP | 1452571 | 9/2004 |
| EP | 1533325 | 5/2005 |
| EP | 1574527 | 9/2005 |
| EP | 1963247 | 9/2008 |
| WO | WO 1994-14904 | 7/1994 |
| WO | WO 2000-44576 | 8/2000 |
| WO | WO 2002-078862 | 10/2002 |
| WO | WO 2003-037623 | 5/2003 |
| WO | WO 2003-059992 | 7/2003 |
| WO | WO 2006-086793 | 8/2006 |
| WO | WO 2008-073685 | 6/2008 |
| WO | WO 2011-014715 | 2/2011 |
| WO | WO 2012-036838 | 3/2012 |

OTHER PUBLICATIONS

Hill, "Sugar-based surfactants for consumer products and technical applications", Fett-Lipid, 1999, vol. 101, No. 1, pp. 25-33.
International Search Repot for PCT International Application No. PCT/US2014/038309, dated Sep. 5, 2014, 3 pgs.

* cited by examiner

*Primary Examiner* — Ramsey E Zacharia
(74) *Attorney, Agent, or Firm* — Thomas M. Spielbauer

(57) ABSTRACT

Provided are aqueous fluoropolymer dispersions containing at least one tetrafluoroethene homopolymer or tetrafluoroethene copolymer and at least one non-aromatic polyhydroxy surfactant. The dispersions contain from 0 to 100 ppm based on the total weight of the dispersion of fluorinated surfactants. Also provided are methods of coating using the dispersions and substrate coated with the dispersions.

15 Claims, No Drawings

FLUOROPOLYMER COMPOSITIONS CONTAINING A POLYHYDROXY SURFACTANT

CROSS REFERENCE TO RELATED APPLICATIONS

This application is a national stage filing under 35 U.S.C. 371 of PCT/US2014/038309, filed May 16, 2014, which claims priority to European Application No. 13168186.8, filed May 17, 2013, the disclosure of which is incorporated by reference in its/their entirety herein.

FIELD

The present disclosure relates to fluoropolymer dispersions with a polyhydroxy surfactant, in particular polyhydroxy surfactants having an acyclic polyhydroxy unit linked to a long chain unit via a linking group, and their applications.

BACKGROUND

Fluoropolymers have been long known and have been used in a variety of applications because of several desirable properties such as heat resistance, chemical resistance, weatherability, UV-stability, low friction and anti-stick properties, etc.

Commonly known or commercially employed fluoropolymers include polytetrafluoroethene (PTFE), copolymers of tetrafluoroethene (TFE, also known as tetrafluoroethylene) and hexafluoropropene (HFP, also known as hexafluoropropylene), such copolymers are also referred to as PEP polymers, copolymers of tetrafluoroethene and perfluoroalkoxy copolymers (also known as PFA), copolymers of ethene and tetrafluoroethene (also known as ETFE polymers), copolymers of tetrafluoroethene, hexafluoropropene and vinylidene fluoride (VDF) (such copolymers also referred to as THV) and polyvinylidene fluoride polymers (PVDF) and others.

Fluoropolymers have been used to improve the thermal and chemical resistance of a substrate or to provide anti stick or low friction properties to a substrate, for example by coating or impregnating the substrate with the fluoropolymers. The fluoropolymers may be applied to the substrate by liquid coating techniques if they are provided as liquid formulations like aqueous dispersions.

Fluoropolymer dispersions can be conveniently produced by aqueous emulsion polymerization employing fluorinated monomers, one or more radical reaction initiators and a suitable surfactant. Fluorinated alkanoic acids of the type $CF_3$—$(CF_2)_n$—$COO^-$ with n being an integer of 6 to 8, and in particular perfluorooctanoic acid (n=6) and its salts, have been the surfactant of choice in the aqueous emulsion polymerization of fluoromonomers for the last decades. Recently also other types of fluorinated surfactants, like fluorinated polyether acids, have been employed. Using fluorinated surfactants increases the solid content (polymer content) of the dispersions and leads to the generation of polymers of desired molecular weight and particle size in acceptable yields and reaction rates. Methods have been developed to retain and recycle the fluorinated surfactants from fluoropolymer dispersions leading to dispersions of low content of fluorinated surfactants. Currently the most commonly used technique to reduce the content of fluorinated surfactants is their removal by ion-exchange chromatography as described, for example, in European Patent EP 1 155 055 B1. However, fluoropolymer dispersions depleted from fluorinated surfactants may have decreased shear stability. Stabilizing surfactants, typically non-ionic surfactants have to be added to increase the stability of such dispersions. In international patent application No. WO2011/014715A1 non aromatic polyols, like alkyl polyglycosides, have been described as useful stabilizing surfactants.

Aqueous dispersions of TFE-homo polymers and TFE-copolymers with a high content of TFE are in particular susceptible to coagulation induced by shear forces. Such polymers are most commonly used in coating applications which require stable dispersions. Therefore, there is a continuous need to further increase the shear stability of coating compositions based on fluoropolymer dispersions containing no or only little amounts of fluorinated surfactants.

SUMMARY

Therefore, in the following there is provided an aqueous fluoropolymer dispersion containing an aqueous fluoropolymer dispersion containing
i) at least one tetrafluoroethene homopolymer or tetrafluoroethene copolymer;
ii) at least one non-aromatic polyhydroxy surfactant containing an acyclic polyhydroxy unit linked by a linking group to a linear or branched long chain unit, comprising an aliphatic residue having from about 3 to 36 carbon atoms and wherein the linking group is selected from amino groups, amido groups, sulfonamide groups, phosphoamido groups, phosphate ester groups, phosphonate ester groups, sulfate ester groups, sulfonate ester groups and carboxylate ester groups;
wherein the dispersion contains from 0 to 100 ppm based on the total weight of the dispersion of fluorinated surfactants.

In another aspect there is provided a substrate containing a coating prepared from the composition above.

In yet a further aspect there is provided a method of coating or impregnating a substrate comprising providing a fluoropolymer composition as above, optionally adding further components, and applying the composition to the substrate.

DETAILED DESCRIPTION

Before any embodiments of this disclosure are explained in detail, it is to be understood that the disclosure is not limited in its application to the details set forth in the following description. The invention is capable of other embodiments and of being practiced or of being carried out in various ways.

Also, it is to be understood that the phraseology and terminology used herein is for the purpose of description, and should not be regarded as limiting. The use of "including," "containing", "comprising," or "having" and is meant to be non-limiting and is meant to encompass the items listed thereafter (and equivalents thereof) as well as additional items. The word "consisting" is used to mean the items listed thereafter (and equivalents thereof) but not any additional items. The use of "a" or "an" is meant to encompass "one or more".

Any numerical range recited herein is intended to be an abbreviation and to explicitly include all values from the lower value to the upper value of that range. For example, a concentration range of from 1% to 50% is intended lo be an abbreviation and to expressly disclose the values between the 1% and 50%, such as, for example, 2%, 40%, 10%, 30%, 1.5%, 3.9% and so forth.

Fluoropolymers and Fluoropolymer Dispersions

Fluoropolymer dispersions according to the present disclosure are aqueous dispersions of fluorpolymer particles. The fluoropolymer dispersions may be raw dispersions or upconcentrated dispersions. Fluoropolymer dispersions resulting from the polymerization (so called raw dispersions) typically have a polymer content of from about 10 up to 45% by weight based on the total weight of the dispersion. The fluoropolymer content in the dispersions may be increased by upconcentration, for example using ultrafiltration as described, for example, in U.S. Pat. No. 4,369,266 or by thermal decantation (as described for example in U.S. Pat. No. 3,037,953 and EP 83 8 506 A1) or by electrodecantation or through evaporation by thermal treatment. The solid content of upconcentrated dispersions is typically from about 45, like more than 45 and up to about 70% by weight.

Although any fluoropolymer may be used, preferred polymers include those that contain at least about 15% or at least about, 30% or at least about 51% by mole of TFE. The problem of shear instability is most prominent in dispersions containing tetrafluoroethene (TFE) homopolymers or TFE copolymers with a comonomer content of up about 20% by weight and more typically up to about 1% by weight. Suitable comonomers include fully fluorinated, partially fluorinated or non-fluorinated olefinic comonomers. Examples include but are not limited to fluoroolefins, such as vinylidene fluoride (VDF), hexafluoropropene (HFP), tetrafluoroethene (TFE), 1,2,3,3,3-pentafluoropropene (1-HPFP), 1,1,3,3,3-pentafluoropropene (2-HPFP), chlorotrifluoroethene (CTFE), vinyl fluoride (VF) and combinations thereof.

Further comonomers include but are not limited to fluorine-containing vinyl ethers and allyl ethers such as perfluoro(alkyl vinyl) ethers, perfluoro (alkoxy vinyl ether), perfluoro (polyoxyalkyl vinyl ether), perfluoro (alkyl allyl ethers), perfluoro (alkyoxy allyl ethers), perfluoro (polyoxyalkyl allyl ethers). In some embodiments the alkyl chain contains from 1 to 10 carbon atoms. Perfluoro(alkyl vinyl) ethers (PAVE) or allyl ether (PAAE) suitable for use as monomers include those of the formula:

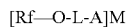
$CF_2=CF-(CF_2)_p-O(R'O)_n(R''O)_mRf$ where R' and R", are different linear or branched perfluoroalkylene groups of 2-6 carbon atoms, m and n are independently 0-6, wherein the sum of n+m may be 0 or at least 1 and Rf is a perfluoroalkyl group of 1-6 carbon atoms and p represents 1 or 0. In some embodiments the number of carbon atoms in the residue (R'O)n(R"O)mRf is not greater than 10 or not greater than 12. Particular embodiments of perfluoro(alkyl vinyl) ethers include perfluoro(methyl vinyl) ether (PMVE) and perfluoro(propyl vinyl) ethers (PPVE).

The fluoropolymers may also contain units or repeating units derived from non-fluorinated or partially fluorinated monomers. Non-fluorinated monomers include alpha-olefins, for example ethene and propene. Partially fluorinated comonomers include but are not limited to vinylfluoride or vinylidenefluoride. Combinations of any of the above named fluoromonomers and combinations of above named fluoromonomers and hydrocarbon olefins can also be used.

Particular useful fluoropolymers include non-meltprocessable fluoropolymers. Non-meltprocessable fluoropolymers have a melt flow index (MFI) at 372° C. and at a 5 kg load (MFI (372/5)) of 0.1 g/10 min or less. TFE homopolymers and TFE copolymers with a comonomer content of up to about 1% by weight are typically non-melt processable. Typically, the fluoropolymers have a high molecular weight. PTFE polymers with a high molecular weight are also referred to as PTFE fine powder. The molecular weight may be determined via the standard specific gravity (SSG) according to ASTM-D-4895. Surfactants, if present may be removed by the extraction procedure of ASTM D-4441 prior to measuring the SSG. In some embodiments, typical fluoropolymers, in particular non-melt processable fluoropolymers, may have an SSG of from about 2.150 to about 2.200.

The fluoropolymer dispersions may be obtained by aqueous emulsion polymerization using a radical initiator as described, for example, in EP 0 030 663 A2 to Kuhls et al, WO 03/059992 to Cavanaugh et al, or EP 1 533 325 A1 to Zipplies et al., incorporated herein by reference. The fluoropolymers may be of a core-shell structure but a core shell architecture is not necessary. The polymerization is typically carried out by using a fluorinated surfactant. Fluorinated surfactants include, for example, linear or branched fluorinated alkanoic or polyether acids, for example carboxylic acids and sulfonic acids. Typically, the fluorinated surfactants contain at least 5 carbon atoms in the anion part and have a molecular weight of the anionic part of less than 5,000 g/mole, more-typically less than 1,000 g/mole. Typical examples include fluorinated polyether acids according to the general formula:

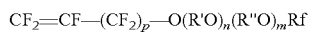
[Rf—O-L-A]M with L being a fully fluorinated (perfluorinated) or partially fluorinated alkylene group, Rf being a partially or fully fluorinated alkyl group wherein the alkyl chain is interrupted by at least one catenary oxygen (ether) atom. A represents an anionic acid residue, for example a carboxylate group, a sulfonate group, a sulfate group, a sulfonate group, a phosphate or a phosphonate group, M represents a cation, typically a metal cation or a hydrogen cation (proton, H$^+$) or a combination thereof, as the counterion(s) to the acid anion A.

L and Rf may be, independently from each other, branched or linear, and preferably, L is linear. The anion part of the surfactants, i.e. the [Rf—O-L-A] part of the surfactants, preferably has a molecular weight of less than 5,000 g/mole, more preferably less than 1,500 g/mole. Typically the anion part, contains at least 3 or at least 5 carbon atoms. Examples of suitable fluorinated polyether surfactants include those described in EP 1 963 247 to Hintzer et al, which is incorporated herein by reference.

The fluoropolymers are typically present in the dispersion in the form of particles. The particles may be rod-shaped but are preferably of spherical shape. In some embodiments the fluoropolymer particles have an average particle size of not more than 600 nm or less than 350 nm, or even less than 250 nm or up to about 199 nm. For example, the fluoropolymers may have an average particle size of from about 20 nm to up to about 198 nm, or from about 51 nm up to about 182 nm or they may have an average particle size of from about 55 nm to less than about 300 nm, or even up to less than about 250 nm or even up to less than about 200 nm. The average particle sizes of the fluoropolymers in the dispersions is typically determined by dynamic light scattering and expressed as Z-average. If not indicated otherwise, the average particle size as used herein is the Z-average.

The dispersions may contain fluoropolymer populations of different particle sizes, i.e. the particle size distribution of the fluoropolymer particles can be bimodal or multi-modal as disclosed in e.g. U.S. Pat. No. 5,576,381, EP 0 990 009 B1 or EP 969 055 A1. Multi-modal fluoropolymer particle dispersions may present advantageous properties in coatings, such as better adhesion to the substrate and denser film formation. For example, the fluoropolymer dispersions may comprise a mixture of first fluoropolymer particles having an average particle size (Z-average) of at least 180 nm in combination with second fluoropolymer particles that have an average particle size (Z-average particle diameter) of less than 180 nm, preferably an average particle size of not more than 0.9 or not more than 0.7 times the average particle size (Z-average) of the first fluoropolymer particles (as disclosed, for example, in U.S. Pat. No. 5,576,381). Bimodal or multi-modal fluoropolymer dispersions can be conveniently obtained by blending the aqueous fluoropolymer dispersions of different fluoropolymer particle sizes together in the desired amounts. The fluoropolymer population may not only be bimodal or multimodal with respect to the particle sizes but may also be bimodal or multimodal with respect to the fluoropolymer types or the molecular weight of the fluoropolymers used. For example the first polymer having an average particle size of at least 180 nm may be a non-meltprocessable fluoropolymer and the second fluoropolymer having an average particles size that is not more than 0.9 or not more than 0.7 times the average particle size of the first polymer may be a non-melt processable or a melt-processable fluoropolymer. Similarly the first or second fluoropolymer may be a fluoroelastomer. In particular, dispersions of non-melt processable fluoropolymers may be mixed with aqueous dispersions of other fluoropolymers, in particular melt-processible fluoropolymers. Suitable dispersion of melt-processable fluoropolymers that can be mixed with the non-melt processable fluoropolymer dispersions include dispersions of the following fluoropolymers: copolymers comprising TFE and a perfluorinated vinyl ether (PFA) and copolymers comprising TFE and HFP (PEP). Such dispersions may be monomodal, bi-modal or multimodal as disclosed in e.g. European patent application No. EP 990 009 A1.

Typically the dispersions obtained from the polymerizations have been treated by a process to completely remove or at least reduce the amount of fluorinated surfactants. Methods of removing the surfactants from the dispersions by an ion-exchange and addition of non-ionic surfactants are disclosed for example in EP 1 155 055 B1, EP 1 193 242 B1 or WO 2006/086793. Typically the dispersions are free of fluorinated surfactant or contain only a reduced amount thereof, such as for example amounts up to about 500 ppm. In some embodiments the amount of fluorinated surfactants is from about 5 to about 200 ppm or from about 10 to about 100 ppm (based on the total weight of the dispersion). The fluorinated surfactants include those as described above.

In preferred embodiments the fluoropolymer dispersions are ion-exchanged dispersions, which means, they have been subjected to an anion-exchange process to remove fluorinated surfactants or other compounds from the dispersions. Therefore, the dispersions may contain non-ionic surfactants of the type as described in EP 1 155 055 B1, BP 1 193 242 B1 or WO2006/086793. Particular examples include but are not limited to non-ionic surfactants corresponding to the general formula:

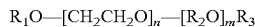

$R_1O—[CH_2CH_2O]_n—[R_2O]_mR_3$ wherein R1 represents a linear or branched aliphatic or aromatic hydrocarbon group having at least 8 carbon atoms, preferably 8 to 18 carbon atoms or is H. In some embodiments the residue R1 corresponds to a residue (R')(R")C— wherein R' and R" are the same or different, linear, branched or cyclic alkyl groups. R2 represents hydrogen or a C1-C3 alkylene unit, n has a value of 0 to 40, m has a value of 0 to 40 and the sum of n+m is at least 2. When the above general formula represents a mixture, n and m will represent the average amount of the respective groups. Also, when the above formula represents a mixture, the indicated amount of carbon atoms in the aliphatic group R1 may be an average number representing the average length of the hydrocarbon group in the surfactant mixture. R3 represents H. Another example of suitable non-ionic surfactants include but are not limited to ethoxylated aromatic compounds and aminoethoxylates.

Suitable commercially available non-ionic surfactant or mixtures of non-ionic surfactants include those available from Clariant GmbH under the trade designation GENAPOL such as GENAPOL X-080 and GENAPOL PF 40. Further suitable non-ionic surfactants that are commercially available include those of the trade designation TERGITOL, TMN 6, TERGITOL TMN 100X, TERGITOL TMN 10, TRITON X-80 and TRITON X-100 (available from Dow Chemical), GENAPOL X-080 and GENAPOL PF40.

It is an advantage of the present disclosure that the polyhydroxy surfactants provided herein can be added to the fluoropolymer dispersions before or during the anion-exchange and can either replace the non-ionic surfactants described above or supplement them. Therefore, the dispersions provided herein may be free or essentially free of non-ionic surfactants other than the polyhydroxy surfactants described herein. "Essentially free" means containing them in an amount of less than 1% by weight based on the total dispersion. Anionic surfactants as described below may be added to the dispersions to further increase their shear stability. Preferably this is done after the ion-exchange process.

Fluoropolymer dispersions can be conveniently upconcentrated, for example to fluoropolymer contents of from about 40 to 70% by weight (based on the weight of the dispersion) by known upconcentration methods, like ultrafiltration (as described, for example in U.S. Pat. No. 4,369,266) thermal upconcentration or electrodecantation (as described for example in EP 1574527A1, U.S. Pat. No. 3,037,953 or EP 818 506 A1). These upconcentration processes are typically carried out in the presence of stabilizing surfactants. The polyhydroxy surfactants as provided herein may be used as stabilizing surfactants and they may be added to the dispersions to be upconcentrated if their initial amount is insufficient.

In some embodiments mere are provided fluoropolymer dispersions containing the fluoropolymers as described above in an amount of from at least 40% by weight and preferably between 45 and 65% by weight based on the weight of the dispersion. They typically contain the polyhydroxy surfactants as described herein in an amount of from about 1 to 15, preferably between about 3 and 10% by weight based on the fluoropolymer content.

In typical embodiments the fluoropolymer dispersions are free of fluorinated surfactant or contain only a reduced amount thereof, such as for example amounts up to about 500 ppm of fluorinated surfactants, preferably fluorinated polyether surfactants. In some embodiments the amount of fluorinated surfactants, preferably fluorinated polyether surfactants, is from about 5 to about 200 ppm or from about 10 to about 100 ppm (based on the total weight of the dispersion).

In some embodiments the fluoropolymer dispersions have a conductivity of at least 50 µS, typically between 100 µS and 1500 µS. The anion exchange process may remove ions and replace them by non-ionic materials and may reduce the conductivity of the dispersion. The desired level of conductivity of the dispersion may be adjusted by adding a salt thereto such as for example a simple inorganic salt, for example but not limited to sodium chloride or ammonium chloride. Also anionic surfactants or polyelectrolytes may be added for this purpose.

In some embodiments the fluoropolymer dispersions may have a viscosity of less than 150 mPa·s at 23+/−3° C., for example between 20 and 140 or between 20 and 95 mPa·s at 23+/−3° C. Typically, the viscosity is still less than 100 mPa·s at 40° C. The viscosity can be determined as described, for example, in EP 1 452 571 B1, incorporated herein by reference. Dispersions having a VTT (viscosity temperature transition) of less than 40° C. may be prepared. The VTT can be determined as described in EP 1 452 571 B1 incorporated herein by reference.

Coatings made from the dispersions may have a critical film thickness (CCT) of at least 10 μm. The CCT may be determined as described, for example, in EP 1 452 571 B1 incorporated herein by reference.

Polyhydroxy Surfactants

The polyhydroxy surfactants provided herein have a polyhydroxy unit linked to a long-chain unit via a linking group. The polyhydroxy unit is acyclic. The surfactants are typically non fluorinated. Generally, they are non-aromatic. Preferably, they are non-ionic. In a preferred embodiment they are non-fluorinated, non-aromatic and non-ionic.

They can be represented by the general formula (I):

R1-Li—R2 (I)

wherein R1 represents the long chain unit, Li the linking group and R2 the acyclic polyhydroxy group.

R1 is a linear or branched aliphatic residue containing from 3 to 36 carbon atoms, wherein the carbon chain of the aliphatic residue may optionally be interrupted by one or more catenary oxygen (ether) atoms; R1 is preferably acyclic. R1 may be an alkyl or alkenyl group wherein the carbon chain may, optionally, be interrupted by one or more than one catenary oxygen atoms to form an ether or polyether residue. Optionally, the alkyl or alkenyl group may also and in addition be substituted by alkoxy or polyoxy alkyl groups.

Li is selected from linking group containing one or more nitrogen atoms, (for example a linking groups containing an amino group, an amide group, a sulfoamido group, or a phosphoamido groups), phosphate ester groups, phosphonate ester groups, sulfate ester groups, sulfonate ester groups, or carboxylate ester groups. Preferably, Li represents a linking group containing one or more nitrogen atoms.

R2 represents an acyclic aliphatic poly hydroxynated group having at least two, preferably adjacent, hydroxyl groups (—OH groups) directly bonded to the carbon chain of the aliphatic residue. Preferably, the poly hydroxynated group R2 contains from 4 to 36 carbon atoms. In addition to the hydroxyl groups, the poly hydroxynated group R2 may also contain other substituents, for example alkoxy or polyoxy alkyl substituents but preferably the group R2 does not contain substituents other than the hydroxyl groups. R2 may be linear or branched. R2 preferably contains a unit of the formula —(CHOH)n- wherein n is an integer from 2 up to and including 8.

In some embodiments the polyhydroxy surfactants are nitrogen-containing surfactants and can be represented by formula (II):

R1-Li—R2'-CH$_2$OH (II)

wherein R1 is defined as above with regard to formula (I),

R2' is an acyclic polyhydroxinated aliphatic group. R2' may be acyclic and is linear or branched and may contain from 3 to 20 carbon atoms and has at least two, preferably adjacent, hydroxyl groups directly bonded to the carbon chain, wherein the chain may further may be interrupted by one or more than one catenary oxygen atoms to introduce ether or polyether functionalities. Preferably, R2' contains a unit —(CHOH)$_n$— wherein n is an integer from 2 up to and including 8.

Li represents a linking group comprising one or more nitrogen atoms. Preferably Li represents an amino (—N(R)—) group, or an amido (—(C═O)N(R)—) group wherein R represents hydrogen or a (linear or branched) alkyl residue, wherein the alkyl residue may optionally be substituted by one or more catenary oxygen atoms (ether atoms).

The polyhydroxy surfactants may be conveniently obtained, for example, by reacting glycamines (providing the polyhydroxy unit) with functionalized alkyls or alkenyls (providing the long chain unit) as described, for example, in U.S. Pat. No. 5,380,891 to Connors et al, incorporated herein by reference.

Glucamines can obtained by a reductive amination of reducing sugars yielding a amino-functionalized ring-opened sugar, the glycoamine. The alkyls (or alkenyls) are functionalized to react with the amine group of the glycamines to form a nitrogen-containing linking group linking the alkyl (or alkenyl) chain to the sugar-derived polyhxydroxy chain. Typical functional groups of the functionalized alkyls (or alkenyls) include but are not limited to acid groups, ester groups including anhydride groups and acide halide groups. Examples of suitable functionalized alkyls (or alkenyls) include but are not limited to fatty acids or fatty acid esters. Accordingly, residue R1 in formulae (I) and (II) may correspond to the hydrocarbon part R' of a fatty acid R'COOH. Fatty acids include saturated and unsaturated fatty acids. Examples of saturated fatty acids include, but are not limited to caprylic acid, capric acid, lauric acid, myristic acid, palmitic acid, stearic acid, arachidic acid, behenic acid, lignoceric acid and cerotic acid. Examples of unsaturated fatty acids include but are not limited to myristoleic acid, palmitoleic acid, sapienic acid, oleic acid, elaidic acid, vaccenic acid, linoleic acid, linolaidic acid, linolenic acid, arachidonic acid, eicosapentaenoic acid, erucic acid, docosahexanenoic acid. R1 may also correspond to the residue of a functionalized aliphatic residue R"X wherein X is a functional group to react with the glycoamine to form the linking group and R" may represent an alkyl or alkenyl residue that contains one or more catenary oxygen atoms, like for example a (poly) ethoxylate or (poly) propoxylate residue or a combination thereof.

In the reductive amination of a sugar the sugar is typically reacted, with ammonia or an alkylamine or alkyloxy or polyoxy alkyl amine (RNH$_2$, wherein R represents H or the alkyl, alkyloxy or polyoxy alkyl group) under reducing conditions, e.g. in the presence of hydrogen and optionally in the presence of catalysts as is known in the art, like for example Ranney nickel. Typical examples are described in U.S. Pat. No. 5, 380,891, incorporated herein by reference.

Preferred sugars that may be used in the above described reaction to prepare glycamines include but are not limited to glucose, fructose, maltose, lactose, galactose, mannose, and xylose, as well as glyceraldehyde. In some embodiments high dextrose corn syrup, high fructose corn syrup, high maltose corn syrup may also be used as raw materials but yield a mixture of glycamines.

In a preferred embodiment of the present disclosure the polyhydroxy surfactants are amido polyhydroxides. They can be represented by the general formula (III):

R$^1$—C(═O)—N(R$^3$)—Z (III)

wherein R³ is H or a linear or branched aliphatic residue containing from 1 to 8 carbon atoms, preferably R³ is H or a C₁-C₄ hydrocarbyl or hydroxyhydrocarbyl, wherein the carbon chain of the aliphatic residue may optionally be interrupted by one or more than one catenary oxygen (ether) atoms. R³ may be linear or branched. Examples of suitable hydroxyhydrocarbyl groups include but are not limited to 2-hydroxyethyl, 2-hydroxypropyl, 2 hydroxbutyl, 3-hydroxy propyl, 3-hydroxy butyl 4-hydroxy butyl. In preferred embodiments R3 represents an alkyl group, more preferably an alkyl group selected from methyl, ethyl, butyl and isobutyl.

R¹ in formula (III) is as defined as R1 of formula (I), Generally R¹ represents a linear or branched aliphatic residue containing from 5 to 31 carbon atoms, preferably a C₅-C₃₁ hydrocarbyl moiety. In some embodiments, R¹ represents a straight chain C₆ to C₂₀ alkyl or alkenyl residue, preferably a C₇-C₁₉ alkyl or alkenyl moiety, preferably a straight chain C₉-C₁₇ alkyl or alkenyl moiety, and more preferably a straight chain C₁₁-C₁₉ alkyl or alkenyl moiety. Typically, R¹ may be the hydrocarbon part R of a fatty acid RCOOH. Fatty acids include saturated and unsaturated fatty acids. Examples of saturated fatty acids include, but are not limited to caprylic acid, capric acid, lauric acid, myristic acid, palmitic acid, stearic acid, arachidic acid, behenic acid, lignoceric acid and cerotic acid. Examples of unsaturated fatty acids include but are not limited to myristoleic acid, palmitoleic acid, sapienic acid, oleic acid, elaidic acid, vaccenic acid, linoleic acid, linolaidic acid, linolenic acid, arachidonic acid, eicosapentaenoic acid, erucic acid, docosahexanenoic acid. R¹ may also represent an alkyl residue as described above that contains one or more catenary oxygen atoms, like for example an ethoxylate or propoxylate residue or a combination thereof.

In formula (III) Z represents a poly hydroxyl hydrocarbyl moiety having at least 2 or at least 3 hydroxy groups directly bonded to the carbon chain. Z is acyclic and may be linear but may also be branched, Z may also contain, in addition to the hydroxyl groups, alkoxy or polyoxyalkyl groups but preferably only contains hydroxyl groups, Z may be derived from a glycamine, e.g. a reducing sugar subjected to a reductive amination reaction to yield a ring-opened amino functionalized sugar. Examples for reducing sugars include but are not limited to glucose, fructose, maltose, lactose, galactose, mannose, xylose and glyceraldehydes, including combinations thereof. In some embodiments high dextrose corn syrup, high fructose corn syrup, high maltose corn syrup may also be used as raw materials which will yield a mixture of glycamines.

In preferred embodiments Z contains an acyclic unit represented by the general formula —(CHOH)ₙ— more preferably —(CHOH)ₙ—CH₂OH wherein n represents an integer of from 2 up to and including 8. Particular examples include embodiments wherein Z is selected from the acyclic groups consisting of

—CH₂—(CHOH)ₙ—CH₂OH;

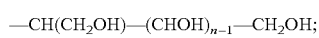
—CH(CH₂OH)—(CHOH)ₙ₋₁—CH₂OH;

and

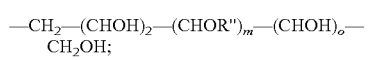
—CH₂—(CHOH)₂—(CHOR")ₘ—(CHOH)ₒ—CH₂OH;

where n is an integer from 1 up to and including 8 preferably up to and including 5; m and o are integers and including 0 wherein the sum of m and o equals n−2 and R" represents substituents selected from identical of different alkoxy, polyoxylalkyl and (poly)hydroxyalkoxy or (poly)hydroxypolyoxyalkyl residues. Specific examples include but are not limited to 1-deoxyglucityl, 2-deoxyglucityl 2-deoxyfructityl, 1-deoxymaltityl, 1-deoxylactityl, 1-deoxygalactityl, 1-deoxymannityl, 1-deoxymaltotriotityl, 2,3-dihydroxypropyl (from glyceraldehyde), etc. In a preferred embodiment Z is a glycityl, more preferably Z is

—CH₂—(CHOH)₄—CH₂—OH.

In some embodiments the polyhydroxides are the reaction product of the reaction of N-alkyl glucamines (e.g. N-methylamine) and fatty acids or fatty acid alkyl esters—as for example described in U.S. Pat. No. 5,380,891.

Suitable amounts of polyhydroxy surfactants include but are not limited to 0.5 to about 25% by weight based on the weight of the dispersion, preferably, based on the weight of the fluoropolymer content of the dispersion.

According to another embodiment of the present disclosure the polyhydroxy surfactants are present as a blend of several polyhydroxy surfactants.

Anionic Surfactants

The dispersions according to the present disclosure may further contain anionic, non-fluorinated surfactants. Anionic surfactants that may be used in connection with this invention include sulfonate, sulfate and phosphonate surfactants. They may contain one or more sulfonate, sulfate or phosphonate groups or combinations thereof and a hydrocarbon aliphatic moiety that may be substituted by catenary oxygen atoms or that is not substituted. The hydrocarbon moiety may be saturated or unsaturated and may contain one, two or three carbon-carbon double bonds.

Examples of hydrocarbon moieties of the anionic hydrocarbon surfactants include saturated and unsaturated aliphatic groups having for example 6 to 40 carbon atoms, preferably 8 to 20 carbon atoms. Such aliphatic groups may be linear or branched. Particular examples of non fluorinated, anionic hydrocarbon surfactants tor use in this disclosure include alkyl sulfonates such as lauryl sulfonate, alkyl sulfates such as lauryl sulfate, fatty acid sulfates or sulfonates (meaning molecules where the carboxylate group has been replaced by the sulfate, sulfonate or phosponate unit) and salts thereof. Fatty acids typically have from about 6 to 26 carbon atoms. They include, for example, oleic acid, stearic acid arachidic acid, arachidonic, linoleic acid, linolenic, erucic, and palmitic acid. Examples of anionic surfactants include commercially available materials like those available under the trade designation HOSTAPUR SAS 30 (secondary alkyl sulphonate sodium salt), HOSTAPUR OS (oleinsulfonate), EMULSOGEN LS (sodium lauryl sulfate) and EMULSOGEN EPA 1954 (mixture of C2 to C4 sodium alkyl sulfates) each available from Clariant GmbH, Germany; TRITON X-200 (sodium alkylsulfonate) available from Dow Chemical Industries.

The anionic surfactants may be typically present in an amount of from about 0.01 to about 2% by weight based on the total weight of the dispersion but the amounts may vary and include higher or lower amounts.

Coating Additives

The fluoropolymer dispersions, in particular when used as coating compositions, may further contain ingredients that may be beneficial when coating or impregnating the dispersion on a substrate, such as adhesion promoters, friction reducing agents, pigments and the like. The dispersions of the present invention can be used to produce final coating compositions for coating various substrates such as metals, fluoropolymer layers and fabrics, such as, for example, glass fiber-based fabrics. The dispersions provided herein are particular suitable for continuous coating processes or for coating application using pumps and/or spray nozzles, i.e. the dispersions are suitable for spray coating. The dispersions are particular suitable for spray coating in the presence of coalescent agents improve the film forming of the coating to obtain more homogeneous films. Coalescent agents are typically slowly evaporating hydrocarbon alcohols, hydrocarbon lactones, hydrocarbon esters or hydrocarbon ethers or combinations thereof, e.g. hydrocarbon ether alcohols, hydrocarbon ether esters. Typically, they have a boiling point of from about 180 to 250° C. Examples include but are not limited to glycerol, propylene glycols and ether and esters thereof, ethylene glycols and ether or esters thereof and butyrolactones.

Coating Dispersions

The fluoropolymer dispersions described herein may be used, for example, to laminate, coat and/or impregnate a substrate or a surface. The surface may be an inorganic or organic material. The substrate may be, for example, a fiber, a fabric, a granule or a layer. Suitable substrates include, but are not limited to, fibers, fabrics, granules and layers. Typically, the substrates include fibers, fabrics, granules and layers containing one or more organic polymers, including, for example, fluoropolymers. The fabrics may be woven or non-woven fabrics. The fibers may be organic or inorganic. Preferably the substrates are metal or coated metals.

Generally, the fluoropolymer dispersions may be blended with further components typically used to produce a final coating composition containing the dispersion described above. Such further components may be dissolved or dispersed in an organic solvent such as toluene, xylene and the like. Typical components that are used in a final coating composition include polymers such as polyamide imides, polyimides or polyarylen sulphides or inorganic carbides, such as silicium carbide, and metal oxides. They are typically employed as heat resistant adhesion prompters or primers. Still further ingredients such as pigments and mica particles may be added as well to obtain the final coating composition. The fluoropolymer dispersions typically represent about 10 to 80% by weight of the final composition. Details on coating compositions for metal coatings and components used therein have been described in e.g. WO 02/78862, WO 94/14904, EP 1 016 466 A1, DE 2 714 593 A1, EP 0 329 154 A1, WO 00/44576, and U.S. Pat. No. 3,489,595. The fluoropolymer compositions provided herein may be used to prepare fluoropolymer coated sheets, fluoropolymer coated cookware or fluoropolymer coated beads, such as chromatographic resins, fluoropolymer containing textiles, garments, outdoor clothing, fluoropolymer layer(s) containing fabrics for use in architecture, tents, and the like, illustrative examples of such articles and methods of preparing them are described in DE 20 2004 020 048 U1, WO 03/037623 and U.S. Patent Publ. No. 2008/0178993.

Advantages and embodiments of this invention are further illustrated by the following exemplified embodiments and examples which should not be construed to limit the invention thereto.

Methods

Fluoropolymer content can be determined as gravimetrically as solids content according to ISO 12086.

Melt flow index (MFI) can be determined according to DIN EN ISO 1 133.

Particle sizes can be determined via inelastic light scattering using a Malvern HAS Zetasizer according to ISO 13321. The average particle sizes are expressed as the Z-average. The Z-average is calculated as $$D_z = \frac{\sum D_i^6}{\sum D_i^5}$$

Melting points can be determined by differential scanning calorimetry (DSC) according to ASTM D 4591. The melting points referred to herein are the melting points of the once molten materials, i.e. the material was brought to the melt, cooled down below its melting point and reheated again to melt.

The content of fluorinated acids can be determined via gas chromatography of the methyl ester using an internal standard, e.g. the methyl ester of perfluoro decanoic acid. To quantitatively convert the acid to the methyl ester, 200 µl dispersion are treated with 2 ml methanol and 1 ml acetylchloride in presence of 0.3 g $MgSO_4$ for 1 hour at 100° C. The formed methyl ester can be extracted with 2 ml hexane and subjected to gas chromatography analysis. The detection limit is <5 ppm.

Conductivity can be measured with the 712 Conductometer, supplied by Metrohm AG, Germany. Surface tension can be measured with the Krüss Tensiometer T9, supplied by Krüss GmbH, Germany, for example by the Wilhelmy method using a platinum plate.

EXAMPLES

Examples 1 and Comparative Example 1

PTFE dispersions were prepared according to EP 0 030 663 A2 but using a fluorinated polyether surfactant instead of perfluorooctanoic acid. The resulting dispersions were ion-exchanged according to EP 1 555 055. Prior to the ion-exchange 5% by weight of different stabilizing surfactants were added. In example 1 the stabilizing surfactant was an amidopolyol (N-nanoyl-N-methylglucamine, prepared according to the teaching of U.S. Pat. No. 5,380,891 to Connor et al, incorporated herein by reference). In comparative example 1 the surfactant was DISPONIL APG 425 (a blend of alkylpolyglycosides with C8-C10 and C10 to C16 chains) and in comparative example 2 the surfactant was TRITON X 100 (a phenolic ethoxylate).

The anion-exchanged dispersions were upconcentrated thermally. The test dispersions contained 58% by weight of fluoropolymer (solids) and less than 10 ppm of fluorinated polyether surfactant. The respective surfactants were added to the dispersions if necessary such that all dispersion contained 5.5% of surfactant.

The dispersions were subjected to a shear stability test as follows:

150 g of the dispersions were thermostated at 20° C. and put in a 250 ml standard glass beaker of an inner diameter of 65 mm. The agitation head (S 25 N-25 G) of an Ultra Turrax T25, supplied by Janke & Kunkel, was immersed in the center of the beaker such that the end of the head was 7 mm above the beaker bottom. The Ultra Turrax was switched on at a revolution speed of 8000 rpm. Agitation rendered the surface of the dispersion "turbulent" or "wavy". After 10 to 20 sec, 2.0 g xylene were added dropwise within less than 10 sec to the agitated dispersion. Time measurement started with the addition of xylene and was stopped when the surface of the agitated dispersion no longer showed visible turbulence. The surface "freezes" or smoothes due to coagulation. Coagulation was accompanied by a characteristic change of sound of the Ultra Turrax. In case that the "surface freezing" could not be clearly observed due to foam formation the time measurement was stopped with the onset of the change of sound. The dispersions according to comparative example C2 coagulated after a period of about 20 minutes, the dispersion of comparative example C 1 coagulated after 49 minutes while the dispersion of example 1 did not coagulate even after 60 minutes. Reported shear stability values are the average from 5 measurements.

List of Exemplary Embodiments

The following list of embodiments is provided to further illustrate the present disclosure and is not meant to limit the present disclosure to the specific embodiments listed below.

1. An aqueous fluoropolymer dispersion containing
   i) at least one tetrafluoroethene homopolymer or tetrafluoroethene copolymer;
   ii) at least one non-aromatic polyhydroxy surfactant of the general formula
   R1-Li—R2, containing an acyclic polyhydroxy unit (R2) linked by a linking group (Li) to a linear or branched long chain unit (R1) comprising an aliphatic residue having from about 3 to 36 carbon atoms and wherein the linking group (Li) is selected from amino groups, amido groups, sulfoamide groups, phosphoamido groups, phosphate ester groups, phosphonate ester groups, sulfate ester groups, sulfonate ester groups and carboxylate ester groups;
   wherein the dispersion contains from 0 to 100 ppm based on the total weight, of the dispersion of fluorinated surfactants.
2. The dispersion of embodiment 1 wherein the acyclic polyhydroxy unit contains an acyclic unit of the general formula —(CHOH)$_n$— wherein n represents an integer of from 2 to 8.
3. The dispersion according to any one of the preceding embodiments wherein the non-aromatic polyhydroxy surfactant contains a linking group selected from amino and amido groups.
4. The dispersion according to any one of the preceding embodiments wherein the non-aromatic polyhydroxy surfactant corresponds to the general formula $$R^1—C(=O)—N(R^3)—Z \qquad (III)$$

wherein
$R^3$ is H or a linear or branched aliphatic residue containing from 1 to 8 carbon atoms, preferably H or a $C_1$-$C_4$ hydrocarbyl or hydroxyhydrocarbyl, wherein the carbon chain of the aliphatic residue may optionally be interrupted by one or more than one catenary oxygen (ether) atoms;
$R^1$ represents R1 or a linear or branched aliphatic residue containing from 5 to 31 carbon atoms, wherein the chain of the aliphatic resin may be interrupted by one or more oxygen (ether) atoms; and wherein Z represents a linear or branched acyclic polyhydroxy unit containing an acyclic unit of the general formula —(CHOH)n- , and n represents an integer of 2 up to and including 8.
5. The dispersion according to embodiment 4 wherein Z contains a residue —(CHOH)$_n$CH$_2$OH wherein n is an integer of from 2 up to and including 8.
6. The dispersion according to anyone of embodiments 4 or 5 wherein Z is selected from the groups consisting of —CH$_2$—(CHOH)$_n$—CH$_2$OH;

—CH(CH$_2$OH)—(CHOH)$_{n-1}$—CH$_2$OH;

and

—CH$_2$—(CHOH)$_r$—(CHOR")$_m$—(CHOH)$_o$—CH$_2$OH;

where n is an integer from 1 up to and including 8 preferably up to and including 5; m and o are integers and including 0 wherein the sum of m and o equals n–2 and R" represents substituents selected from identical of different alkoxy, polyoxylalkyl and (poly)hydroxyalkoxy or (poly) hydroxypolyoxyalkyl residues.
7. The dispersion according to any one of the preceding embodiments wherein the non-aromatic polyhydroxy surfactant is the reaction product of the reaction of an N-alkyl glycamine with a fatty acid or a fatty acid alkyl ester.
8. The dispersion according to any one of the preceding embodiments wherein the fluorinated surfactant is a fluorinated polyether acid.
9. The dispersion according to either one of the preceding embodiments wherein the fluorinated surfactant is a polyether acid selected from the general formula:

[Rf—O-L-A]M with L being a fully fluorinated (perfluorinated) or partially fluorinated alkylene group, Rf being a partially or fully fluorinated alkyl group wherein the alkyl chain is interrupted by at least one catenary oxygen (ether) atom, A representing an acid group and M representing the counterion to the acid group A.
10. The dispersion according to any one of the preceding embodiments wherein the fluorinated surfactant is a polyether acid selected from the general formula:

[Rf—O-L-A]M with L being a fully fluorinated (perfluorinated) or partially fluorinated alkylene group, Rf being a partially or fully fluorinated alkyl group wherein the alkyl chain is interrupted by at least one catenary oxygen (ether) atom, A representing an acid group and M representing the counterion to the acid group A and wherein the anion part [Rf—O-L-A] has a molecular weight of less than 1,500 g/mole.
11. The dispersion according to any one of the preceding embodiments wherein the composition has a fluoropolymer content of from about 10 to about 70 wt %, preferably 40 to 65 wt %, based on the total weight of the dispersion.
12. The dispersion according to any one of the preceding embodiments wherein the fluoropolymer has a melt flow index (MFI) of less than 0.1 g/10 min at 372° C. and a load of 5 kg.
13. The aqueous dispersion according to any one of the preceding embodiments wherein the polyhydroxy surfactant corresponds to formula (III) and wherein $R_1$ of formula (Ill) represents a linear or branched $C_7$-$C_{19}$ alkyl or alkenyl moiety.
14. The aqueous dispersion according to any one of the preceding embodiments wherein the polyhydroxy surfactant corresponds to formula (III) and wherein $R_1$ of formula (III) represents a $C_9$-$C_{17}$ alkyl or alkenyl moiety.
15. The aqueous dispersion of any one of the preceding embodiments wherein the polyhydroxy surfactant corresponds to formula (III) and wherein $R_1$ of formula (III) represents a saturated, linear $C_{11}$-$C_{19}$ alkyl or alkenyl moiety.
16. The aqueous dispersion of any one of the preceding embodiments wherein the residue $R^1$—(CO)—N segment of formula (III) is a fatty acid amido group selected from cocamido, stearamido, oleamido, lauramido, myristamido, capricamido, palmitamido, tallowamido, linelaicamido, linelenoic amido.
17. The aqueous dispersion according to any one of the preceding embodiments wherein the polyhydroxy surfactant corresponds to formula (III) and wherein Z is selected from 1-deoxyglucityl, 2-deoxyglucityl, 2-deoxyfructityl, 1-deoxymaltityl, 1-deoxylactityl, 1-deoxygalactityl, 1-deoxymannityl, 1-deoxymaltotriotityl, 2,3-dihydroxypropyl (from glyceraldehyde) groups, that may be alkoxylated at one or more hydroxyl groups with the proviso that at least two hydroxy groups are not alkoxylated.

18. The dispersion according to any one of the preceding embodiments wherein the polyhydroxy surfactant corresponds to formula (III) and wherein $R^3$ is selected from hydrogen, 2-hydroxyethyl, 2-hydroxypropyl, 2 hydroxbutyl, 3-hydroxy propyl, 3-hydroxy butyl, 4-hydroxy butyl or a linear or branched alkyl group containing from 1 to 8 carbon atoms.

19. The aqueous dispersion of any one of the preceding embodiments wherein the polyhydroxy surfactant corresponds to formula (III) and wherein in $R^3$ is selected from methyl, ethyl, propyl, isopropyl and butyl.

20. The dispersion of arty one of the preceding embodiments further comprising an anionic surfactant selected from sulfates, sulfonates and phosphonates.

21. The dispersion of any one of the preceding embodiments wherein the anionic surfactants are selected from aliphatic hydrocarbon sulfates, sulfonates and phosphonates.

22. The dispersion according to any one of the preceding embodiments further comprising a coalescent agent.

23. The dispersion according to any one of the preceding embodiments wherein the fluoropolymer has an average particle size (Z-average) of from about 20 to about 500 nm.

24. The dispersion according to any one of the proceeding embodiments wherein, the fluoropolymer contains a core and at least one shell wherein the at least one shell has a lower molecular weight than the core.

25. The dispersion according to any one of the preceding embodiments wherein the fluoropolymer has a melt flow index of less than 0.1 g/10 min at 372° C. and a load of 10 kg.

26. The dispersion according to any one of the preceding embodiments wherein the fluoropolymer is a TFE copolymer, wherein the comonomer is selected from perfluorinated alkyl vinyl ether and/or perfluorinated alkyl allyl ethers, wherein the alkyl group may contain one or more oxygen atoms and contains up to 10 carbon atoms.

27. The dispersion according to any one of the preceding embodiments wherein the fluoropolymer is selected from tetrafluoroethene homopolymers or tetrafluoroethene copolymers containing up to 1% by weight of perfluorinated comonomers.

28. The dispersion according to any one of the preceding embodiments wherein the fluoropolymer has a inciting point between about 312° C. and about 350° C.

29. The dispersion according to any one of the preceding embodiments being a coating composition further containing one or more of the following: a metal oxide, a metal carbide, at least one non-fluorinated polymer, or a combination thereof.

30. The dispersion according to any one of the preceding embodiments containing from about 1 to about 20% weight based on the weight of the composition of the non-aromatic polyhydroxy surfactant.

31. The dispersion according to any one of the preceding embodiments containing from about 0.2 to about 5 weight % based on the weight of the dispersion of the anionic surfactant.

32. A substrate containing a coating prepared from a coating composition comprising the dispersion according to any one of embodiments 1 to 31.

33. A method of coating a substrate comprising applying a coating composition comprising the dispersion according to any one of embodiments 1 to 31 to the substrate.

34. The method of embodiment 33 wherein the coating composition is applied by spray coating.

35. The method of embodiment 33 to 34 wherein the substrate is selected from cookware, bearings, fibers and fabrics.

36. A substrate containing a coating prepared from a coating composition comprising the dispersion according to any one of embodiments 1 to 31.

The invention claimed is:
1. An aqueous fluoropolymer dispersion containing
   i) at least one tetrafluoroethene homopolymer or tetrafluoroethene copolymer;
   ii) at least one non-aromatic polyhydroxy surfactant containing an acyclic polyhydroxy unit linked by a linking group to a linear or branched long chain unit comprising an aliphatic residue having from 3 to 36 carbon atoms wherein the chain of the aliphatic resin may be interrupted by one or more oxygen (ether) atoms and wherein the linking group is selected from amino groups, amido groups, sulfoamido groups, and phosphoamido groups;
   wherein the dispersion contains from 0 to 100 ppm based on the total weight of the dispersion of fluorinated surfactants.

2. The dispersion of claim 1 wherein the acyclic polyhydroxy unit contains an acyclic unit of the general formula —(CHOH)$_n$— wherein n represents an integer of from 2 to 8.

3. The dispersion of claim 1 wherein the non-aromatic polyhydroxy surfactant contains a linking group selected from amino and amido groups.

4. The dispersion of claim 1 wherein the non-aromatic polyhydroxy surfactant corresponds to the general formula

wherein
   $R^3$ is H or a linear or branched aliphatic residue containing from 1 to 8 carbon atoms, wherein the carbon chain of the aliphatic residue may optionally be interrupted by one or more than one catenary oxygen (ether) atoms;
   $R^1$ represents a linear or branched aliphatic residue containing from 5 to 31 carbon atoms, wherein the chain of the aliphatic resin may be interrupted by one or more oxygen (ether) atoms; and wherein
   Z represents a linear or branched acyclic polyhydroxy unit containing an acyclic unit of the general formula —(CHOH)n-, and n represents an integer of 2 up to and including 8.

5. The dispersion of claim 4 wherein Z contains a residue —(CHOH)$_n$CH$_2$OH wherein n is an integer of from 2 up to and including 8.

6. The dispersion of any one of claim 4 or 5 wherein Z is selected from the group consisting of

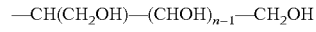

and

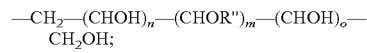

where n is an integer from 2 up to and including 8; m and o are integers and including 0 wherein the sum of m and o equals n–2 and R" represents substituents selected from identical of different alkoxy, polyoxylalkyl and (poly)hydroxyalkoxy or (poly)hydroxypolyoxyalkyl residues.

7. The dispersion of claim 1 wherein the non-aromatic polyhydroxy surfactant is the reaction product of the reaction of an glycamine or an N-alkyl glycamine with a fatty acid or a fatty acid alkyl ester.

8. The dispersion of claim 1 wherein the fluorinated surfactant is a fluorinated polyether acid.

9. The dispersion of claim 1 wherein the fluorinated surfactant is a polyether acid selected from the general formula:

[Rf—O-L-A]M with L being a fully fluorinated (perfluorinated) or partially fluorinated alkylene group, Rf being a partially or fully fluorinated alkyl group wherein the alkyl chain is interrupted by at least one catenary oxygen (ether) atom, A representing an acid group and M representing the counterion to the acid group A.

10. The dispersion of claim 9, wherein the anion part [Rf—O-L-A] has a molecular weight of less than 1,500 g/mole.

11. The dispersion of claim 1 wherein the composition has a fluoropolymer content of from about 10 to about 70 wt % based on the total weight of the dispersion.

12. The dispersion of claim 1 wherein the fluoropolymer has a melt flow index (MFI) of less than 0.1 g/10min at 372° C. and a load of 5 kg.

13. A substrate containing a coating prepared from a coating composition comprising the dispersion of claim 1.

14. A method comprising coating a substrate with a dispersion according to claim 1.

15. The method of claim 14 wherein the coating is spray coating.

* * * * *

UNITED STATES PATENT AND TRADEMARK OFFICE
CERTIFICATE OF CORRECTION

PATENT NO. : 9,969,848 B2  
APPLICATION NO. : 14/891592  
DATED : May 15, 2018  
INVENTOR(S) : Tilman Zipplies Page 1 of 1

It is certified that error appears in the above-identified patent and that said Letters Patent is hereby corrected as shown below:

In the Specification

Column 2  
Line 28, Delete "sulfonamide" and insert -- sulfoamido --, therefor.

Column 3  
Line 13, Delete "EP 83 8 506 A1)" and insert -- EP 818 506 A1) --, therefor.

Column 6  
Line 45, Delete "mere" and insert -- there --, therefor.

Column 7  
Line 42, Delete "amide" and insert -- amido --, therefor.

Column 12  
Line 34, Delete "EP 1 555 055." and insert -- EP 1 155 055. --, therefor.

Column 14  
Line 48, Delete "(I11)" and insert -- (III) --, therefor.

Column 15  
Line 18, Delete "arty" and insert -- any --, therefor.  
Line 50, Delete "inciting" and insert -- melting --, therefor.

Signed and Sealed this  
Ninth Day of October, 2018

Andrei Iancu  
*Director of the United States Patent and Trademark Office*